United States Patent
Ji et al.

(10) Patent No.: US 10,374,845 B1
(45) Date of Patent: Aug. 6, 2019

(54) INPUT SIGNAL DECODING CIRCUIT FOR RECEIVER SIDE IN MOBILE INDUSTRY PROCESSOR INTERFACE C-PHY

(71) Applicant: LONTIUM SEMICONDUCTOR CORPORATION, Hefei Anhui (CN)

(72) Inventors: Xiangyu Ji, Hefei Anhui (CN); Yu Chen, Hefei Anhui (CN); Cheng Tao, Hefei Anhui (CN)

(73) Assignee: LONTIUM SEMICONDUCTOR CORPORATION, Hefei, Anhui (CN)

( * ) Notice: Subject to any disclaimer, the term of this patent is extended or adjusted under 35 U.S.C. 154(b) by 0 days.

(21) Appl. No.: 16/047,596

(22) Filed: Jul. 27, 2018

(30) Foreign Application Priority Data

Feb. 13, 2018 (CN) .......................... 2018 1 0149824

(51) Int. Cl.
*H04L 25/14* (2006.01)
*H04L 25/49* (2006.01)

(52) U.S. Cl.
CPC .......... *H04L 25/14* (2013.01); *H04L 25/4917* (2013.01)

(58) Field of Classification Search
CPC ........................... H04L 25/14; H04L 25/4917
USPC .................................................. 341/100–101
See application file for complete search history.

(56) References Cited

U.S. PATENT DOCUMENTS

| | | | | |
|---|---|---|---|---|
| 4,350,973 A * | 9/1982 | Petryk, Jr. | ............... | H04B 10/69 341/100 |
| 6,233,294 B1 * | 5/2001 | Bowers | ...................... | G06F 1/10 375/356 |
| 7,199,728 B2 * | 4/2007 | Dally | .................. | H04L 25/4904 341/100 |
| 7,492,291 B2 * | 2/2009 | Murray | ................. | H03M 5/145 341/100 |
| 2005/0063707 A1 * | 3/2005 | Imai | ........................ | H04L 25/14 398/141 |
| 2009/0040082 A1 * | 2/2009 | Hinz | ..................... | G11C 7/1051 341/100 |
| 2013/0287311 A1 * | 10/2013 | Furihata | .................... | G06T 9/00 382/233 |

* cited by examiner

*Primary Examiner* — Lam T Mai
(74) *Attorney, Agent, or Firm* — Cantor Colburn LLP

(57) ABSTRACT

An input signal decoding circuit for a receiver side in a mobile industry processor interface (MIPI) C-Phy is provided, which includes: an equalizer circuit module connected to a transmitter side of an MIPI via three signal wires and configured to sample signals of the signal wires to acquire a first data signal, a second data signal and a third data signal; a clock recovery circuit module configured to acquire an operating clock signal from the three data signals; a decoding circuit module configured to outputs a Flip signal, a Rotation signal and a Polarity signal based on the three data signals and the operating clock signal; and a serial-to-parallel conversion module configured to output 21-bit parallel data based on the Flip signal, the Rotation signal and the Polarity signal.

6 Claims, 4 Drawing Sheets

US 10,374,845 B1

INPUT SIGNAL DECODING CIRCUIT FOR RECEIVER SIDE IN MOBILE INDUSTRY PROCESSOR INTERFACE C-PHY

CROSS-REFERENCE TO RELATED APPLICATION

The present application claims priority under 35 U.S.C. § 119 to Chinese Patent Application No. 201810149824.3, filed on Feb. 13, 2018, the entire contents of which are incorporated herein by reference.

FIELD

The present disclosure relates to the technical field of mobile communication, and in particular to an input signal decoding circuit for an RX side in an MIPI C-Phy.

BACKGROUND

Mobile Industry Processor Interface (MIPI) is an open standard and specification initiated by MIPI Alliance, which is developed for a processor used in a mobile device. C-Phy is the latest interface protocol for MIPI, which is different from previous D-Phy and M-Phy for MIPI. D-Phy and M-Phy use a differential signal transmission mode involving two wires. Three wires, voltages of which are different, are used to transmit a signal in C-Phy to obtain different wire states. A transmitter (TX) side converts 16-bit data which is to be transmitted into 21-bit data by table looking-up and mapping. The 21-bit data includes seven 3-bit serial symbols. The wire states should be controlled to be jumped for 7 times if the seven symbols are transmitted to a receiver (RX) side.

After the RX side receives the signal from a signal wire connected to the RX side, it is necessary to decode the signal to acquire the 3-bit serial symbols outputted by the TX side, thereby the MIPI communicates normally.

SUMMARY

In view of this, an input signal decoding circuit for a receiver (RX) side in a mobile industry processor interface (MIPI) C-Phy is provided in the present disclosure, which is used to decode an input signal received at the RX side in the MIPI, to acquire a 3-bit serial symbol outputted by a transmitter (TX) side, thereby a normal communication is performed.

The technical solutions provided according to the disclosure are described as follows.

An input signal decoding circuit for a receiver (RX) side in a mobile industry processor interface (MIPI) C-Phy is provided. The input signal decoding circuit includes: an equalizer circuit module, a clock recovery circuit module, a decoding circuit module and a serial-to-parallel conversion module. The equalizer circuit module is connected to a transmitter (TX) side of an MIPI via three signal wires and is configured to sample signals of the signal wires to acquire a first data signal, a second data signal and a third data signal. The clock recovery circuit module is configured to acquire an operating clock signal from the first data signal, the second data signal and the third data signal. The decoding circuit module is configured to output a Flip signal, a Rotation signal and a Polarity signal based on the first data signal, the second data signal, the third data signal and the operating clock signal. The serial-to-parallel conversion module is configured to output a 3-bit serial symbol based on the Flip signal, the Rotation signal and the Polarity signal.

In an embodiment, the equalizer circuit module includes a first resistor, a second resistor, a third resistor, a first operation amplifier circuit, a second operation amplifier circuit and a third operation amplifier circuit. The first resistor, the second resistor and the third resistor have the same resistance. One end of the first resistor, one end of the second resistor and one end of the third resistor are connected to form a star circuit. A non-inverting input end of the first operation amplifier circuit is connected to a first signal wire of the three signal wires, the other end of the first resistor and an inverting input end of the third operation amplifier circuit. An inverting input end of the first operation amplifier is connected to a second signal wire of the three signal wires. An output end of the first operation amplifier circuit is configured to output the first data signal. A non-inverting input end of the second operation amplifier circuit is connected to the second signal wire, the other end of the second resistor and the inverting input end of the first operation amplifier circuit. An inverting input end of the second operation amplifier circuit is connected to a third signal wire of the three signal wires. An output end of the second operation amplifier circuit is configured to output the second data signal. A non-inverting input end of the third operation amplifier circuit is connected to the third signal wire, the other end of the third resistor and the inverting input end of the second operation amplifier circuit. An output end of the third operation amplifier circuit is configured to output the third data signal.

In an embodiment, the resistance of each of the first resistor, the second resistor and the third resistor is 50Ω.

In an embodiment, the decoding circuit module includes a sampling circuit, a first coding circuit and a second coding circuit. The sampling circuit is configured to sample the first data signal, the second data signal and the third data signal based on the operating clock signal to obtain three pieces of current clock cycle data, three pieces of last clock cycle data and three pieces of inverting data of the last clock cycle data. The first coding circuit is configured to perform an exclusive or operation on the three pieces of current clock cycle data, the three pieces of last clock cycle data and the three pieces of inverting data of the last clock cycle data to obtain change modes that the current clock cycle data changes relative to the last clock cycle data. The second coding circuit is configured to process the change modes to acquire the Flip signal, the Rotation signal and the Polarity signal.

In an embodiment, the change modes include a clockwise rotation mode, an anticlockwise rotation mode, a polarity flip mode, a clockwise rotation and polarity flip mode, and an anticlockwise rotation and polarity flip mode.

In an embodiment, the sampling circuit includes: a first trigger, a second trigger and a first inverter connected in series; a third trigger, a fourth trigger and a second inverter connected in series; a fifth trigger, a sixth trigger and a third inverter connected in series. The first trigger is configured to receive the first data signal and output one piece of the current clock cycle data based on the operating clock signal. The second trigger is configured to output one piece of the last clock cycle data. The first inverter is configured to output one piece of the inverting data. The third trigger is configured to receive the second data signal and output one piece of the current clock cycle data based on the operating clock signal. The fourth trigger is configured to output one piece of the last clock cycle data. The second inverter is configured to output one piece of the inverting data. The fifth trigger is configured to receive the third data signal and output one piece of the current clock cycle data based on the operating clock signal. The sixth trigger is configured to output one piece of the last clock cycle data. The third inverter is configured to output one piece of the inverting data.

It can be seen in the above technical solution that an input signal decoding circuit for a receiver side in the MIPI C-Phy is provided in the present disclosure. The input signal decoding circuit includes: an equalizer circuit module, a clock recovery circuit module, a decoding circuit module and a serial-to-parallel conversion module. The equalizer circuit module is connected to a transmitter (TX) side of an MIPI via three signal wires and is configured to sample signals of the signal wires to acquire a first data signal, a second data signal and a third data signal. The clock recovery circuit module is configured to acquire an operating clock signal from the first data signal, the second data signal and the third data signal. The decoding circuit module is configured to output a Flip signal, a Rotation signal and a Polarity signal based on the first data signal, the second data signal, the third data signal and the operating clock signal. The serial-to-parallel conversion module is configured to output a 3-bit serial symbol based on the Flip signal, the Rotation signal and the Polarity signal. A signal outputted from the TX side is converted by the above circuit into the 3-bit serial symbol, the data at the TX side is recovered so that a MIPI communicates normally.

BRIEF DESCRIPTION OF THE DRAWINGS

For more clearly illustrating embodiments of the present disclosure or the technical solution in the conventional technology, drawings referred to describe the embodiments or the conventional technology will be briefly described hereinafter. Apparently, the drawings in the following description show only several embodiments of the present disclosure, and for those skilled in the art, other drawings may be obtained based on these drawings without any creative efforts.

DETAILED DESCRIPTION OF EMBODIMENTS

Technical solutions according to embodiments of the disclosure are described clearly and completely hereinafter in conjunction with the drawings for the embodiments of the present disclosure. Apparently, the described embodiments are only a few rather than all of the embodiments of the disclosure. Any other embodiments obtained by those skilled in the art based on the embodiments according to the present disclosure without any creative work fall into the protection scope of the present disclosure.

Figure 1:
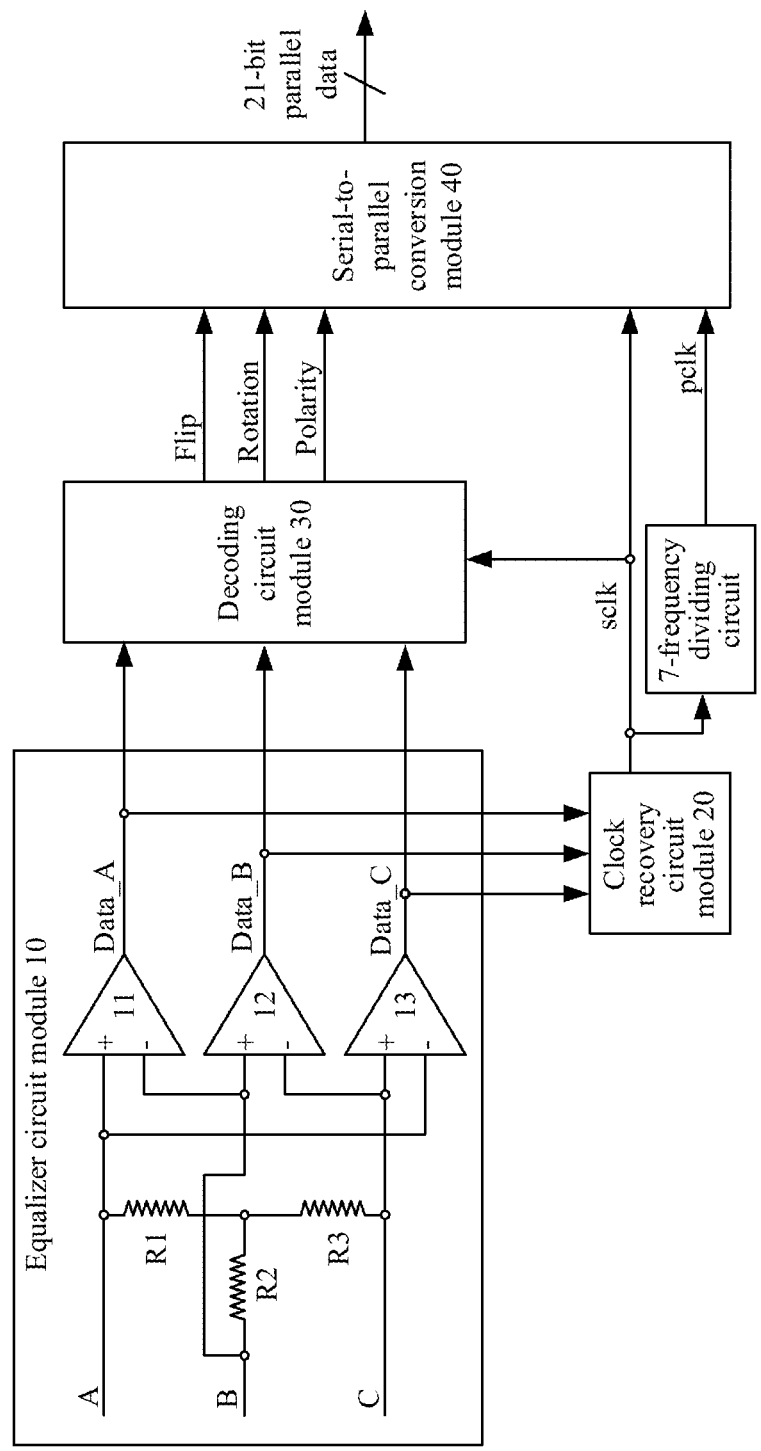
FIG. 1 is a circuit diagram of an input signal decoding circuit for an RX side in a MIPI C-Phy according to an embodiment of the present disclosure.

FIG. 1 is a circuit diagram of an input signal decoding circuit for a receiver (RX) side in a MIPI C-Phy according to an embodiment of the present disclosure.

As shown in FIG. 1, in the embodiment, an input signal decoding circuit is connected to a transmitter (TX) side via three signal wires and is configured to decode a signal outputted from the TX side, and convert a 3-bit serial symbol outputted from the TX side into 21-bit parallel data. The input signal decoding circuit includes an equalizer circuit module 10, a clock recovery circuit module 20, a decoding circuit module 30 and a serial-to-parallel conversion module 40.

The equalizer circuit module is connected to a transmitter (TX) side of an MIPI via three signal wires and is configured to sample signals of the signal wires to acquire a first data signal Data_A, a second data signal Data_B and a third data signal Data_C.

There is no special clock channel in C-Phy and the clock information is contained in the data transmitted by the signal lines, so an operating clock signal is acquired by the clock recovery circuit module from the data. The clock recovery circuit module is connected to an output end of the equalizer circuit module and is configured to process the first data signal Data_A, the second data signal Data_B and the third data signal Data C to acquire the operating clock signal Seril_Clk (serial clk, sclk).

The decoding circuit module is configured to output a Flip signal, a Rotation signal and a Polarity signal based on the first data signal Data_A, the second data signal Data_B, the third data signal Data_C and the operating clock signal.

The serial-to-parallel conversion module is configured to perform serial-to-parallel conversion on the Flip signal, the Rotation signal and the Polarity signal outputted by the decoding circuit module, to acquire and output 21-bit parallel data.

It can be seen in the above technical solution that an input signal decoding circuit for a receiver side in the MIPI C-Phy is provided in the present disclosure. The input signal decoding circuit includes: an equalizer circuit module, a clock recovery circuit module, a decoding circuit module and a serial-to-parallel conversion module. The equalizer circuit module is connected to a transmitter (TX) side of an MIPI via three signal wires and is configured to sample signals of the signal wires to acquire a first data signal, a second data signal and a third data signal. The clock recovery circuit module is configured to acquire an operating clock signal from the first data signal, the second data signal and the third data signal. The decoding circuit module is configured to output a Flip signal, a Rotation signal and a Polarity signal based on the first data signal, the second data signal, the third data signal and the operating clock signal. The serial-to-parallel conversion module is configured to acquire a 21-bit parallel data based on the Flip signal, the Rotation signal and the Polarity signal. A signal outputted from the TX side is converted by the above circuit into the 21-bit parallel data, the data at the TX side is recovered so that a MIPI communicates normally.

In the embodiment, the equalizer circuit module 10 includes a first resistor R1, a second resistor R2, a third resistor R3, a first operation amplifier circuit 11, a second operation amplifier circuit 12 and a third operation amplifier circuit 13. One end of the first resistor, one end of the second resistor and one end of the third resistor are connected, and the three resistors form a star circuit. The resistance of each resistor is 50Ω.

A non-inverting input end of the first operation amplifier circuit is connected to a first signal wire A of the three signal wires, the other end of the first resistor and an inverting input end of the third operation amplifier circuit. An inverting input end of the first operation amplifier circuit is connected to a second signal wire B of the three signal wires. An output end of the first operation amplifier circuit is configured to output the first data signal.

A non-inverting input end of the second operation amplifier circuit is connected to the second signal wire B, the other end of the second resistor and the inverting input end of the first operation amplifier circuit. An inverting input end of the second operation amplifier circuit is connected to a third signal wire C of the three signal wires. An output end of the second operation amplifier circuit is configured to output the second data signal.

A non-inverting input end of the third operation amplifier circuit is connected to the third signal wire C, the other end of the third resistor and the inverting input end of the second operation amplifier circuit. An output end of the third operation amplifier circuit is configured to output the third data signal.

In the embodiment, the decoding circuit module includes a sampling circuit, a first coding circuit and a second coding circuit.

Figure 2:
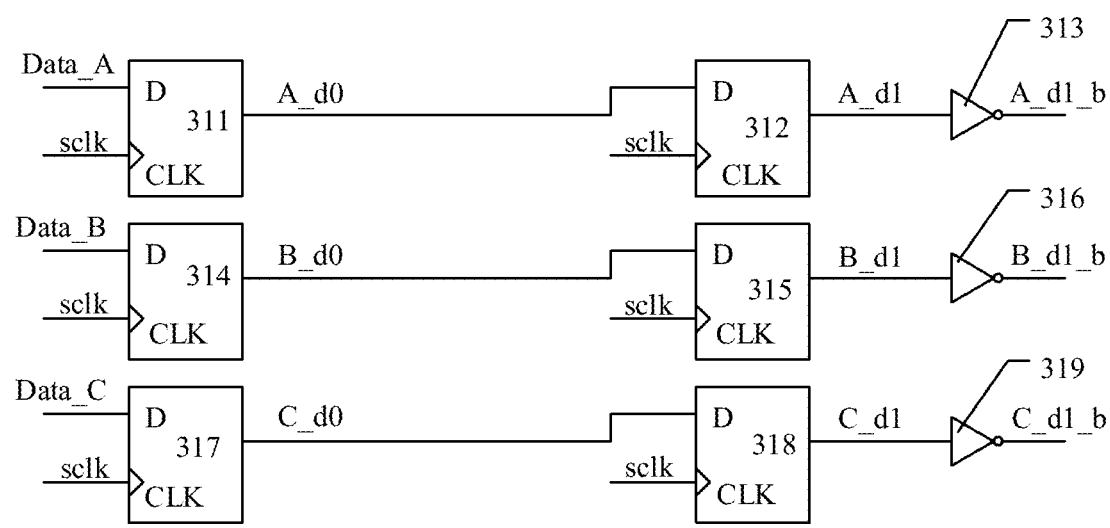
FIG. 2 is a circuit diagram of a sampling circuit according to an embodiment of the present disclosure.

The sampling circuit includes: a first trigger 311, a second trigger 312 and a first inverter 313 connected in series; a third trigger 314, a fourth trigger 315 and a second inverter 316 connected in series; a fifth trigger 317, a sixth trigger 318 and a third inverter 319 connected in series, as shown in FIG. 2. The sampling circuit is configured to sample the first signal data, the second signal data and the third signal data based on the operating clock signal to obtain three pieces of current clock cycle data A_d0, B_d0 and C_d0, three pieces of last clock cycle data A_d1, B_d1 and C_d1, and three pieces of inverting data A_d1_b, B_d1_b and C_d1_b.

The first trigger is configured to receive the first data signal and output one piece of the current clock cycle data A_d0 based on the operating clock signal, the second trigger is configured to output one piece of the last clock cycle data A_d1, and the first inverter is configured to output one piece of the inverting data A_d1_b. The third trigger is configured to receive the second data signal and output one piece of the current clock cycle data B_d0 based on the operating clock signal, the fourth trigger is configured to output one piece of the last clock cycle data B_d1, and the second inverter is configured to output one piece of the inverting data B_d1_b. The fifth trigger is configured to receive the third data signal and output one piece of the current clock cycle data C_d0 based on the operating clock signal, the sixth trigger is configured to output one piece of the last clock cycle data C_d1, and the third inverter is configured to output one piece of the inverting data C_d1_b.

Figure 3:
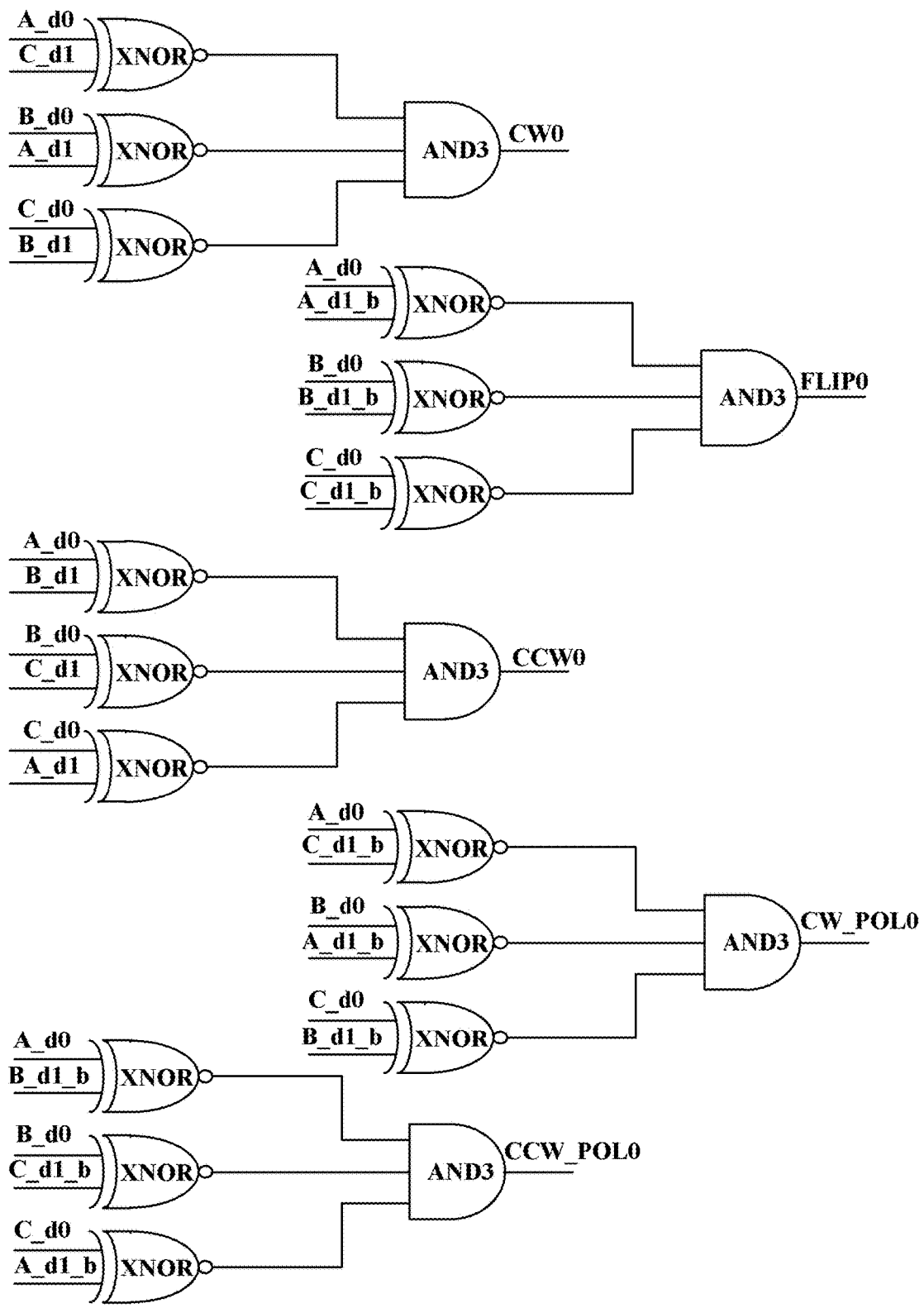
FIG. 3 is a circuit diagram of a first coding circuit according to an embodiment of the present disclosure.

The first coding circuit is configured to perform an exclusive or operation on the three pieces of current clock cycle data, the three pieces of last clock cycle data and the three pieces of inverting data of the last clock cycle data to obtain change modes that the current clock cycle data changes relative to the last clock cycle data. The specific circuit of the first coding circuit is shown in FIG. 3. The change modes include a clockwise rotation mode CW0, an anticlockwise rotation mode CCW0, a polarity flip mode FLIP0, a clockwise rotation and polarity flip mode CW_POL0, and an anticlockwise rotation and polarity flip mode CCW_POL0.

Figure 4:
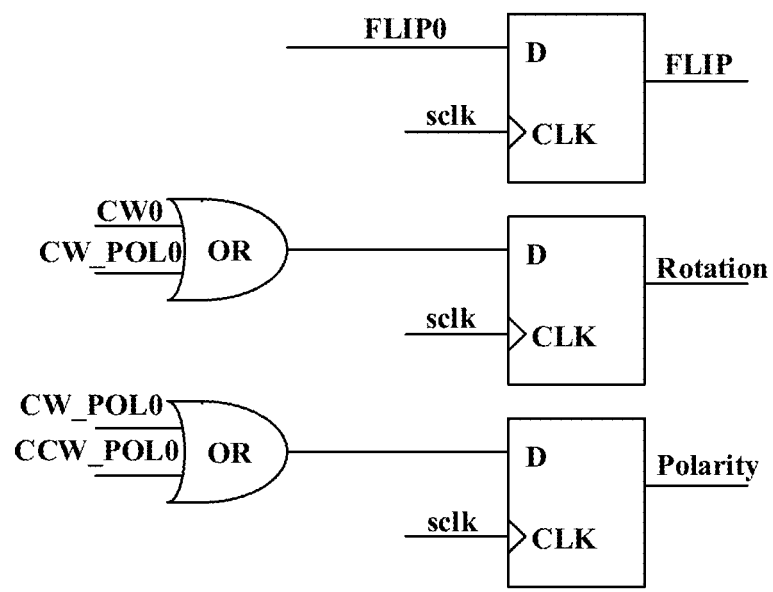
FIG. 4 is a circuit diagram of a second coding circuit according to an embodiment of the present disclosure.

The second coding circuit is configured to process the change modes to acquire the Flip signal, the Rotation signal and the Polarity signal. The specific circuit of the second coding circuit is shown in FIG. 4.

It should be noted that the embodiments in the specification are described in a progressive manner, with the emphasis of each of the embodiments on the difference from other embodiments. For the same or similar parts between the embodiments, reference may be made one to another.

It should be understood by those skilled in the art that, the embodiments of the present disclosure may be provided as methods, devices or computer program products. Accordingly, the present disclosure may take the form of an entirely hardware embodiment, an entirely software embodiment or an embodiment combining software and hardware aspects. In addition, the present disclosure may take a form of one or more computer program products implemented on a computer available storage medium (including but is not limited to disk memory, CD-ROM, optical memory and the like) containing computer available program codes.

The present disclosure is described with reference to flowcharts and/or block diagrams of methods, devices (systems), and computer program products according to embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor or other programmable data processing device to produce a machine, such that the instructions, which execute via the processor of the computer or other programmable data processing device, create means for implementing the functions specified in one or more flows in the flowcharts and/or one or more blocks in the block diagrams.

These computer program instructions may also be stored in a computer-readable memory that can direct a computer or other programmable data processing device to function in a particular manner, such that the instructions stored in the computer-readable memory produce a manufacture including instruction means that implement the function specified in one or more flows in the flowcharts or specified in one or more blocks in the block diagrams.

These computer program instructions may be loaded to a computer or other programmable data processing devices, to perform a series of operations and steps on the computer or other programmable devices to generate processing realized by computer. In this case, the instructions executed on the computer or other programmable devices provide steps of implementing functions specified in one or more flows in the flowcharts and/or one or more blocks in the block diagrams.

Although the preferred embodiments of the present disclosure are described, those skilled in the art may make additional changes and modifications to the embodiments once they know the basic creative concepts. Therefore, the appended claims are intended to be explained as including the preferred embodiments and all changes and modifications falling within the scope of the present disclosure.

It should be further noted that the relationship terminologies such as "first", "second" and the like are only used herein to distinguish one entity or operation from another entity or operation, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or also include the elements inherent for the process, method, article or device. Unless expressively limited otherwise, an element defined by the statement "comprising (including) a . . . " does not exclude the case that the process, method, article or device including the element may include other similar elements.

The technical solutions provided in the present disclosure are described in detail above. The principle and implementations of the present disclosure are described herein by using specific examples. The descriptions about the embodiments are merely provided for ease of understanding of the method and core ideas of the present disclosure. A person of ordinary skill in the art may make modifications to the present disclosure in terms of the specific implementations and application scopes according to the ideas of the present disclosure. Therefore, content of this specification shall not be construed as a limit to the present disclosure.

The invention claimed is:

1. An input signal decoding circuit for a receiver (RX) side in a mobile industry processor interface (MIPI) C-Phy, the input signal decoding circuit comprising:
    an equalizer circuit module connected to a transmitter (TX) side of an MIPI via three signal wires and configured to sample signals of the signal wires to acquire a first data signal, a second data signal and a third data signal;
    a clock recovery circuit module configured to acquire an operating clock signal from the first data signal, the second data signal and the third data signal;
    a decoding circuit module configured to output a Flip signal, a Rotation signal and a Polarity signal based on the first data signal, the second data signal, the third data signal and the operating clock signal; and
    a serial-to-parallel conversion module configured to output 21-bit parallel data based on the Flip signal, the Rotation signal and the Polarity signal.

2. The input signal decoding circuit according to claim 1, wherein the equalizer circuit module comprises a first resistor, a second resistor, a third resistor, a first operation amplifier circuit, a second operation amplifier circuit and a third operation amplifier circuit, wherein the first resistor, the second resistor and the third resistor have the same resistance, wherein
    one end of the first resistor, one end of the second resistor and one end of the third resistor are connected to form a star circuit;
    a non-inverting input end of the first operation amplifier circuit is connected to a first signal wire of the three signal wires, the other end of the first resistor and an inverting input end of the third operation amplifier circuit, an inverting input end of the first operation amplifier circuit is connected to a second signal wire of the three signal wires, and an output end of the first operation amplifier circuit is configured to output the first data signal;
    a non-inverting input end of the second operation amplifier circuit is connected to the second signal wire, the other end of the second resistor and the inverting input end of the first operation amplifier circuit, an inverting input end of the second operation amplifier circuit is connected to a third signal wire of the three signal wires, and an output end of the second operation amplifier circuit is configured to output the second data signal; and
    a non-inverting input end of the third operation amplifier circuit is connected to the third signal wire, the other end of the third resistor and the inverting input end of the second operation amplifier circuit, and an output end of the third operation amplifier circuit is configured to output the third data signal.

3. The input signal decoding circuit according to claim 2, wherein the resistance of each of the first resistor, the second resistor and the third resistor is 50 Ω.

4. The input signal decoding circuit according to claim 1, wherein the decoding circuit module comprises:
    a sampling circuit configured to sample the first data signal, the second data signal and the third data signal based on the operating clock signal to obtain three pieces of current clock cycle data, three pieces of last clock cycle data and three pieces of inverting data of the last clock cycle data;
    a first coding circuit configured to perform an exclusive or operation on the three pieces of current clock cycle data, the three pieces of last clock cycle data and the three pieces of inverting data of the last clock cycle data to obtain change modes that the current clock cycle data changes relative to the last clock cycle data; and
    a second coding circuit configured to process the change modes to acquire the Flip signal, the Rotation signal and the Polarity signal.

5. The input signal decoding circuit according to claim 4, wherein the change modes comprise a clockwise rotation mode, an anticlockwise rotation mode, a polarity flip mode, a clockwise rotation and polarity flip mode, and an anticlockwise rotation and polarity flip mode.

6. The input signal decoding circuit according to claim 4, wherein the sampling circuit comprises:
    a first trigger, a second trigger and a first inverter connected in series; a third trigger, a fourth trigger and a second inverter connected in series; a fifth trigger, a sixth trigger and a third inverter connected in series, wherein
    the first trigger is configured to receive the first data signal and output one piece of the current clock cycle data based on the operating clock signal, the second trigger is configured to output one piece of the last clock cycle data, and the first inverter is configured to output one piece of the inverting data;
    the third trigger is configured to receive the second data signal and output one piece of the current clock cycle data based on the operating clock signal, the fourth trigger is configured to output one piece of the last clock cycle data, and the second inverter is configured to output one piece of the inverting data; and
    the fifth trigger is configured to receive the third data signal and output one piece of the current clock cycle data based on the operating clock signal, the sixth trigger is configured to output one piece of the last clock cycle data, and the third inverter is configured to output one piece of the inverting data.

* * * * *